United States Patent
Cao (10) Patent No.: US 11,151,954 B2
(45) Date of Patent: Oct. 19, 2021

(54) ARRAY SUBSTRATE, DISPLAY PANEL AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventor: Junhong Cao, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/309,459

(22) PCT Filed: Oct. 22, 2018

(86) PCT No.: PCT/CN2018/111178
§ 371 (c)(1),
(2) Date: Dec. 13, 2018

(87) PCT Pub. No.: WO2020/042304
PCT Pub. Date: Mar. 5, 2020

(65) Prior Publication Data
US 2021/0225313 A1  Jul. 22, 2021

(30) Foreign Application Priority Data

Aug. 31, 2018 (CN) .......................... 201811010707.5

(51) Int. Cl.
*G09G 3/36* (2006.01)
*G02F 1/1345* (2006.01)

(52) U.S. Cl.
CPC ....... *G09G 3/3677* (2013.01); *G02F 1/13454* (2013.01); *G09G 2300/0809* (2013.01)

(58) Field of Classification Search
CPC ......... G09G 3/3677; G09G 2300/0809; G09G 3/3674; G02F 1/13454; G02F 1/133528
See application file for complete search history.

(56) References Cited

U.S. PATENT DOCUMENTS

| | | |
|---|---|---|
| 2001/0090410 | 5/2004 | Ohmuro et al. |
| 2015/0185520 A1* | 7/2015 | Xu ..................... G02F 1/133514 349/38 |
| 2015/0221265 A1* | 8/2015 | Huang ................. G09G 3/3696 345/690 |

(Continued)

FOREIGN PATENT DOCUMENTS

| CN | 1497311 A | 11/2006 |
|---|---|---|
| CN | 101364392 A | 2/2009 |

(Continued)

*Primary Examiner* — Brent D Castiaux
(74) *Attorney, Agent, or Firm* — Kilpatrick Townsend & Stockton (57) ABSTRACT

An array substrate, a display panel, and a display device are provided. A Thin Film Transistor (TFT) device of a Gate Driver on Array (GOA) circuit includes a first-type TFT, a second-type TFT, a third-type TFT, and a fourth-type TFT that are disposed at intervals.

14 Claims, 3 Drawing Sheets

(56) References Cited

U.S. PATENT DOCUMENTS

2015/0269897 A1* 9/2015 Kitsomboonloha ........................ G09G 3/3648
345/205

FOREIGN PATENT DOCUMENTS

| | | |
|---|---|---|
| CN | 203325416 U | 12/2013 |
| CN | 103680453 A | 3/2014 |
| CN | 105892174 A | 8/2016 |
| CN | 105931611 A | 9/2016 |
| CN | 106710550 A | 5/2017 |
| CN | 107300813 A | 10/2017 |
| WO | 2013143148 A1 | 10/2013 |

* cited by examiner

ARRAY SUBSTRATE, DISPLAY PANEL AND DISPLAY DEVICE

FIELD

This application relates to the technical field of display, and more particularly relates to an array substrate, a display panel, and a display device.

BACKGROUND

Due to a number of advantages such as thinness, a light weight, and power saving, a liquid crystal display panel is widely applied to electronic products such as televisions, mobile phones, and digital cameras. With the rapid development of a liquid crystal display technology, higher productivity and lower production costs are persistent pursuits of the liquid crystal display panel. A Gate Driver on Array (GOA) technology can be applied to the liquid crystal display panel for replacing an external Integrated Circuit (IC) to make a driving circuit of a horizontal scanning line on a substrate around a display area, thereby effectively improving the productivity and reducing the production costs.

Output of a conventional GOA circuit is controlled by a Thin Film Transistor (TFT) device, and the TFT device is composed of a plurality of TFT elements that are closely adjacent. Failure of any one of the TFT elements will lead to failure of the TFT device, thus resulting in failure of the entire GOA circuit. Therefore, the conventional GOA circuit has a shortcoming of low working reliability.

According to various embodiments of this application, an array substrate, a display panel, and a display device are provided.

An array substrate is provided. The array substrate includes a GOA circuit. An output end of the GOA circuit is provided with a TFT device. The TFT device includes a plurality of TFT units that are disposed at intervals and include a first-type TFT unit, a second-type TFT unit, a third-type TFT unit, and a fourth-type TFT unit.

A source of the first-type TFT unit, a source of the second-type TFT unit, a source of the third-type TFT unit, and a source of the fourth-type TFT unit are connected, a drain of the first-type TFT unit, a drain of the second-type TFT unit, a drain of the third-type TFT unit, and a drain of the fourth-type TFT unit are connected, and a gate of the first-type TFT unit, a gate of the second-type TFT unit, a gate of the third-type TFT unit, and a gate of the fourth-type TFT unit are connected, where the gate of the first-type TFT unit is further used for connecting to a control signal output end of the GOA circuit, the drain of the second-type TFT unit is further used for connecting to a clock signal input end of the GOA circuit, and the source of the third-type TFT unit is further used for connecting to a driven unit.

A display panel is provided. The display panel includes:
the array substrate described in any of the above;
a color filter, the color filter being opposite to the array substrate; and
a liquid crystal layer, the liquid crystal layer being disposed between the array substrate and the color filter.

A display device is provided. The display device includes a backlight module and the foregoing display panel.

Details of one or more embodiments of this application will be proposed in the following drawings and descriptions.

Other features, objectives and advantages of the present disclosure will be apparent from the specification, drawings and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

5 is a schematic diagram of cutting off a failed fourth-type TFT unit in a TFT device in an embodiment.

DETAILED DESCRIPTION OF THE INVENTION

For ease of understanding, embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
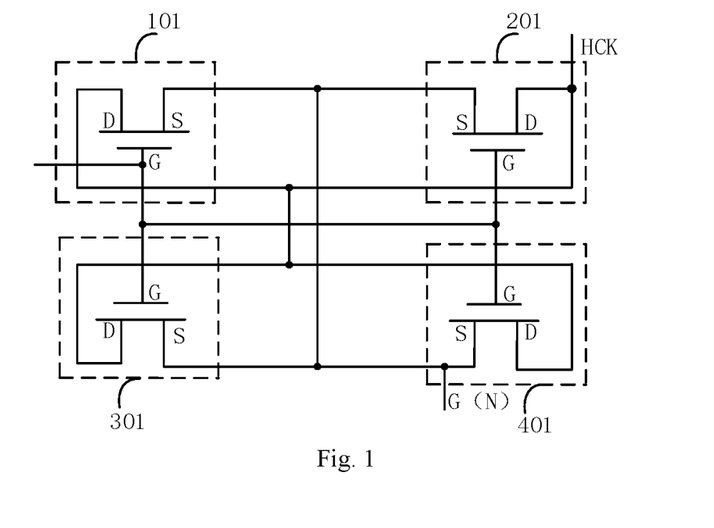
FIG. 1 is a schematic diagram of a TFT device in an embodiment.
Figure 2:
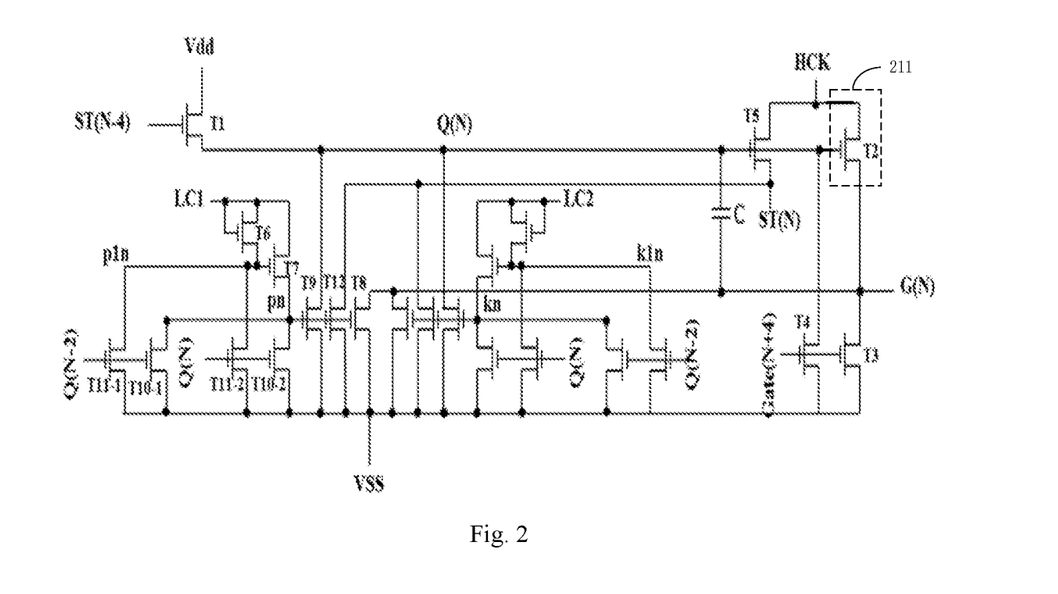
FIG. 2 is a schematic diagram of a GOA circuit in an embodiment.

Referring to FIG. 1 and FIG. 2, an array substrate includes a GOA circuit. An output end of the GOA circuit is provided with a TFT device 211. The TFT device 211 includes a plurality of TFT units that are disposed at intervals and include a first-type TFT unit 101, a second-type TFT unit 201, a third-type TFT unit 401, and a fourth-type TFT unit 301. A source (S) of the first-type TFT unit 101, a source of the second-type TFT unit 201, a source of the third-type TFT unit 401, and a source of the fourth-type TFT unit 301 are connected. A drain (D) of the first-type TFT unit 101, a drain of the second-type TFT unit 201, a drain of the third-type TFT unit 401, and a drain of the fourth-type TFT unit 301 are connected. A gate (G) of the first-type TFT unit 101, a gate of the second-type TFT unit 201, a gate of the third-type TFT unit 401, and a gate of the fourth-type TFT unit 301 are connected. The gate of the first-type TFT unit 101 is further used for connecting to a control signal output end of the GOA circuit, the drain of the second-type TFT unit 201 is further used for connecting to a clock signal input end (HCK) of the GOA circuit, and the source of the third-type TFT unit 401 is further used for connecting to a driven unit.

Specifically, a conventional method for providing a drive signal for a driven unit is soldering an external IC to an array substrate, and providing, through the external IC, a scanning drive signal for each driven unit. However, with the development of a liquid crystal display technology, people have higher requirements on the productivity, costs, and display effects of a liquid crystal display device, particularly in the field of display screens such as mobile phones, and a higher screen-to-body ratio becomes the development mainstream of the field of display screens. By adopting a conventional external IC soldering process, the non-display area of the array substrate may occupy a large proportion, which is adverse for the design of a narrow bezel and goes against the pursuit of people for a higher screen-to-body ratio.

The GOA circuit is in diverse forms. However, the output of the GOA circuit is controlled by the TFT device 211. Therefore, the stable operation of the TFT device 211 is particularly important. In a conventional GOA circuit, since all TFT elements in a conventional TFT device 211 are tightly distributed without having any gap therebetween, failure of one of the TFT elements will lead to failure of the entire TFT device 211, and consequently, the entire GOA circuit cannot operate. To reduce the failure possibility of the GOA circuit, the TFT device 211 of the GOA circuit includes a first-type TFT unit 101, a second-type TFT unit 201, a third-type TFT unit 401, and a fourth-type TFT unit 301. Gates of the TFT units are connected together, sources of the TFT units are connected together, and drains of the TFT units are connected together. The gate of the first-type TFT unit 101 is connected to a control signal output end of the GOA circuit, and is equivalent to a gate of an original TFT device 211. The drain of the second-type TFT unit 201 is connected to a clock signal input end of the GOA circuit, and is equivalent to a drain of the original TFT device 211. The source of the third-type TFT unit 401 is connected to a driven unit, and is equivalent to a source of the original TFT device 211. The same function as that of the original TFT device is achieved. None of the source, drain and gate of the fourth-type TFT unit 301 is directly connected to an external circuit or device. Therefore, in the case of failure of the fourth-type TFT unit 301, the failed fourth-type TFT unit 301 can be directly cut off. This does not affect the normal working of the TFT device, thus reducing the possibility of direct failure of the entire TFT device.

Figure 3:
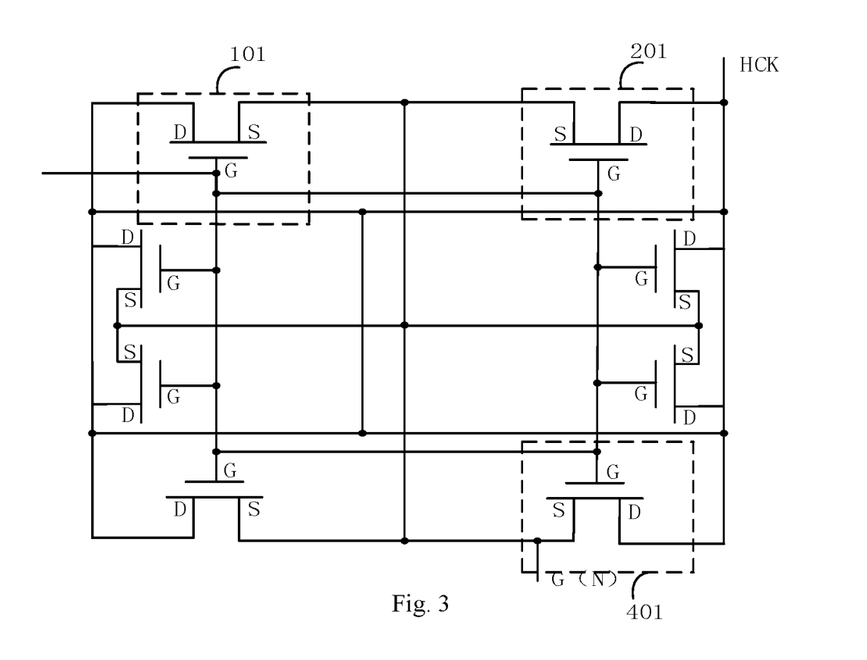
FIG. 3 is a schematic diagram of a TFT device in another embodiment.

It will be appreciated that in an embodiment, referring to FIG. 3, the number of the fourth-type TFT units 301 is not unique, where 101 is the first-type TFT unit, 201 is the second-type TFT unit, 401 is the third-type TFT unit, and other TFT units are all the fourth-type TFT units. When any one of the fourth-type TFT units is failed, the failed fourth-type TFT unit can be directly cut off, and it is still possible for the remaining TFT units to output a scanning drive signal to the driven unit.

In an embodiment, a plurality of fourth-type TFT units 301 may be failed at the same time. In this case, the failed fourth-type TFT units 301 can be all cut off, and a scanning drive signal can be output by the remaining fourth-type TFT units 301, the first-type TFT unit 101, the second-type TFT unit 201, and the third-type TFT unit 401. It should be noted that in an embodiment, the failed fourth-type TFT unit 301 can be cut off by laser cutting. The laser cutting refers to: irradiating a cut material with a laser beam having high power density to make the material be heated to a vaporization temperature immediately, forming a hole by evaporation, and forming a narrow kerf continuously by the holes as the beam movably irradiates the material, so as to complete cutting of the material. A connecting line between the failed fourth-type TFT unit 301 and the remaining TFT units is cut out directly by laser cutting, and the failed fourth-type TFT unit 301 is cut off. It will be appreciated that in other embodiments, other cutting modes such as plasma cutting may also be adopted to cut off the failed TFT unit.

Figure 4:
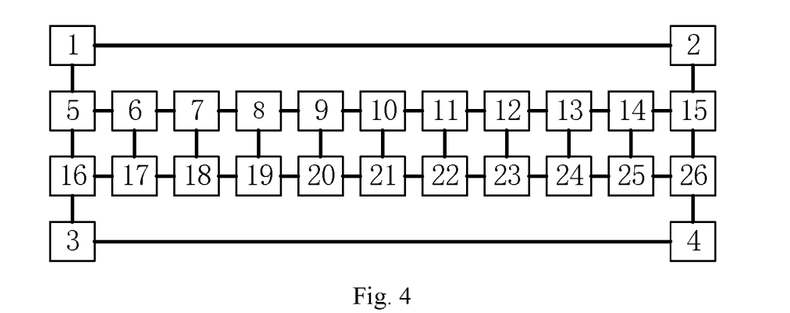
FIG. 4 is a layout diagram of a TFT device in an embodiment.

Further, in an embodiment, referring to FIG. 4, the number of the fourth-type TFT units 301 is 23. Specifically, the TFT unit No. 1 is the first-type TFT unit 101, the TFT unit No. 2 is the second-type TFT unit 201, the TFT unit No. 4 is the third-type TFT unit 401, and the remaining TFT units No. 3 and 5-26 are the fourth-type TFT units 301. A connecting relationship between the TFT units is similar to a connecting relationship between the TFT units shown in FIG. 3, where the sources are connected to each other, and the drains are connected to each other. In the case of failure of any one of the fourth-type TFT units 301, the failed fourth-type TFT unit 301 can be directly cut off, and the remaining TFT elements can ensure the normal operation of the GOA circuit as well. In an embodiment, in the case of simultaneous failure of a plurality of fourth-type TFT units 301, the failed fourth-type TFT units 301 can be directly cut off, and the remaining TFT units can also ensure the normal operation of the GOA circuit.

It should be noted that, by taking the arrangement mode of TFT units shown in FIG. 4 as an example, the number of fourth-type TFT units 301 failed simultaneously can be 1 to 13. As long as the number does not exceed 13, the fourth-type TFT units 301 failed simultaneously can be directly cut, and the stable operation of the GOA circuit can be ensured. It will be appreciated that in other embodiments, the TFT units can also be arranged in other forms. As long as the number of the fourth-type TFT units 301 failed simultaneously does not exceed half of the number of all TFT units, the fourth-type TFT units 301 failed simultaneously can be directly cut, and the remaining TFT units can still ensure the normal operation of the GOA circuit. By means of the foregoing array substrate, the TFT device 211 is split into a plurality of TFT units connected to each other. When the fourth-type TFT unit 301 is failed, the failed fourth-type TFT unit 301 can be directly cut off. This does not affect the normal operation of the GOA circuit corresponding to the TFT device 211, so that the possibility of failure of the entire TFT device 211 is effectively reduced, thus improving the working reliability of the GOA circuit.

Figure 5:
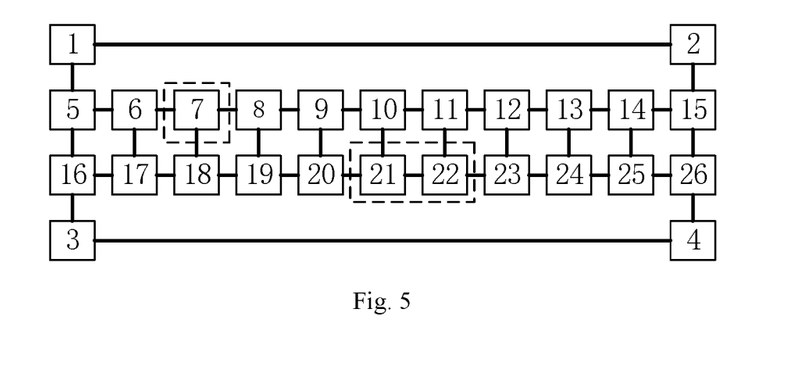

In an embodiment, referring to FIG. 5, when the fourth-type TFT unit 301 No. 7 is failed, it is directly cut off, that is, along a position shown by a dotted line around the fourth-type TFT unit 301 No. 7 in FIG. 5, connection between the fourth-type TFT unit 301 No. 7 and the fourth-type TFT units 301 No. 6, No. 8 and No. 18 is cut off. Similarly, when the fourth-type TFT units 301 No. 21 and No. 22 are failed, connection between the fourth-type TFT units 301 No. 21 and No. 22 and the fourth-type TFT units 301 No. 10, No. 11, No. 20 and No. 23 is cut off, and the remaining TFT units can still ensure the normal operation of the GOA circuit.

In an embodiment, each TFT unit includes a plurality of TFT elements, and the number of TFT elements of each TFT unit is not exactly the same.

Specifically, a TFT is a thin film transistor, which is one type of field effect transistors and is mainly formed by depositing various different thin films on a substrate such as a semiconductor active layer, a dielectric layer, and a metal electrode layer. Hydrogenated amorphous silicon is used as a main material for most of TFTs, so that most of the TFTs are non-transparent, and the TFTs are mainly applied to the field of liquid crystal display technologies. Each TFT unit (that is, the first-type TFT unit 101, the second-type TFT unit 201, the third-type TFT unit 401, and the fourth-type TFT unit 301) is composed of a plurality of TFT elements, and moreover, the number of the TFT elements of each TFT unit can be the same or different.

In an embodiment, the number of the TFT elements of the fourth-type TFT unit is less than the number of the TFT elements of the first-type TFT unit, the number of the TFT elements of the second-type TFT unit, or the number of elements of the third-type TFT unit. Specifically, the number of elements of the fourth-type TFT unit 301 can be set to be less than that of the first-type TFT units 101, the second-type TFT units 201, or the third-type TFT units 401, and moreover, the number of the TFT elements of each fourth-type TFT unit 301 can be further set to be different. The number of the TFT elements of the fourth-type TFT unit 301 is set to be smaller, and any of the failed fourth-type TFT units 301 can be cut, thereby effectively reducing the possibility of failure of the TFT device 211.

It will be appreciated that the number of TFT elements specifically provided for each TFT unit is not unique and different choices can be made according to different situations. Further, in an embodiment, the number of TFT elements of each TFT unit can be the same. Specifically, each TFT unit includes the same number of TFT elements, so that the advantage of convenient processing is also achieved while the possibility of failure of the TFT device 211 is reduced.

In an embodiment, each TFT unit includes three TFT elements. Specifically, three TFT elements constitute one TFT unit, so that when it is ensured that each TFT unit has an independent source, drain and gate, it can also be ensured that fewer TFT elements are cut off when any failed TFT unit needs to be cut off, thus further guaranteeing the working reliability of the TFT device.

Figure 6:
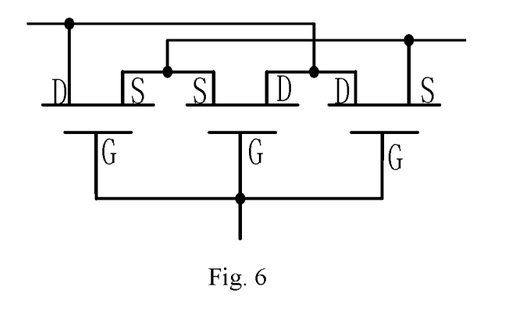
FIG. 6 is a schematic diagram of a TFT unit in an embodiment.

Further, in an embodiment, referring to FIG. 6, each TFT unit includes a first TFT element, a second TFT element, and a third TFT element. A source of the first TFT element is connected to a source of the second TFT element, and the sources thereof are both connected to a source of the third TFT element. A drain of the second TFT element is connected to a drain of the third TFT element, and the drains thereof are both connected to a drain of the first TFT element. The source of the third TFT element is connected to an adjacent TFT unit, and the drain of the first TFT element is connected to an adjacent TFT unit. A gate of the first TFT element is connected to a gate of the second TFT element, and the gates thereof are both connected to a gate of the third TFT element.

Specifically, each TFT unit includes three TFT elements that are connected to each other. The TFT unit formed by connecting three TFT elements to each other is equivalent to a larger TFT element. The first TFT element and the third TFT element located at both ends are connected to an external circuit respectively. The TFT unit No. 7 in the structure of the TFT device 211 as shown in FIG. 4 is taken as an example. When the number of TFT elements in the TFT unit is 3, sources of the TFT elements are connected, drains of the TFT elements are connected, and gates of the TFT elements are connected. The drain of the first TFT element is connected to the drain of the first TFT element in an adjacent TFT unit, the source of the third TFT element is connected to the source of the third TFT element in another adjacent TFT unit, and the TFT units and the TFT devices 211 in the TFT units are cascaded in a similar manner. Similarly, in a TFT unit including six TFT elements, ports of the TFT elements are connected in a manner similar to the connection manner of the foregoing three TFT elements, gates of six TFT elements jointly form a gate of the TFT unit, and a source of the first TFT element and a drain of the second TFT element are equivalent to a source and a drain of the TFT unit respectively.

It should be noted that in each TFT unit, the number of TFT elements is not limited to three in this embodiment, and can also be other numbers. For example, in an embodiment, each TFT unit includes six TFT elements, the connection manner of each TFT element is similar to that in the embodiment for the foregoing three TFT elements, two TFT elements are connected to an external circuit, and details are not provided herein.

Figure 7:
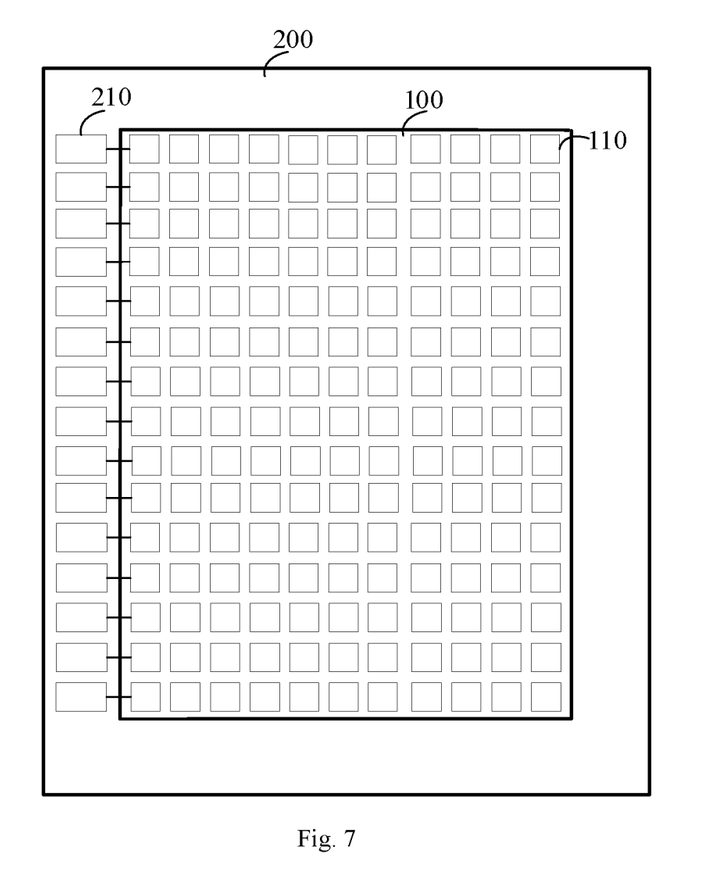
FIG. 7 is a schematic diagram of an array substrate in an embodiment.

In an embodiment, referring to FIG. 7, the driven unit is a pixel unit. Specifically, the array substrate has a plurality of data lines arranged in a first direction and a plurality of scanning lines arranged in a second direction, and the plurality of data lines arranged in the first direction and the plurality of scanning lines arranged in the second direction are intersected by insulation. A pixel unit 110 in array distribution is defined at an insulated intersecting position of each data line and each scanning line. After driving signals are provided for the pixel unit 110 through the data line and the scanning line respectively, the pixel unit 110 emits light to complete image displaying.

In an embodiment, referring to FIG. 7, the array substrate has a non-display area 200 and a display area 100 adjacent to the non-display area 200, the pixel unit 110 is disposed in the display area 100 in array distribution, the GOA circuit 210 is disposed in the non-display area 200, and each GOA circuit 210 provides a drive signal for each pixel row.

Specifically, the array substrate has a non-display area 200 and a display area 100 adjacent to the non-display area 200, the GOA circuit 210 is disposed in the non-display area 200, the display area 100 is provided with a pixel unit 110 in array distribution, and each GOA circuit 210 provides a drive signal for each pixel row. Each GOA circuit 210 provides a scanning signal for a pixel row. By providing the corresponding GOA circuit 210 in the non-display area 200 of the array substrate, the occupation of the non-display area 200 can be reduced while the productivity is effectively improved and the production costs are reduced, thus facilitating the design of a narrow bezel and meeting the pursuit of people for a higher screen-to-body ratio.

It should be noted that in an embodiment, the pixel unit 110 includes a Red (R) pixel unit, a Green (G) pixel unit, a Blue (B) pixel unit, and a White (W) pixel unit. The pixel unit of the array substrate is set to be RGBW and is applied to a display device, it is only necessary to provide a corresponding transparent area for the white pixel unit on a color filter, light transmittance of the color filter can be improved, and energy consumption of the backlight module can be reduced. A specific arrangement manner of the RGBW pixel units can be determined according to actual use situations. For example, in an embodiment, the pixel units in each pixel row are arranged in a cyclic manner of RGBW. It will be appreciated that in other embodiments, the pixel unit 110 includes a red pixel unit, a green pixel unit and a blue pixel unit. The pixel unit 110 can also be in a cyclic arrangement manner of the R, G and B pixel units.

According to the foregoing array substrate, a TFT device located at an output end of the GOA circuit includes a plurality of TFT units that are disposed at intervals. Gates of the TFT units are connected, drains of the TFT units are connected, and sources of the TFT units are connected. The cascaded connection to the GOA circuit and the driven unit is implemented through the gate of the first-type TFT unit, the drain of the second-type TFT unit, and the source of the third-type TFT unit, so as to complete the corresponding functions of the TFT device. Since the fourth-type TFT unit is only connected to other units of the TFT device, when the fourth-type TFT unit is failed, the failed fourth-type TFT unit can be directly cut off. This does not affect the normal working of the TFT device, and a drive signal can be still normally output. By means of the foregoing array substrate, a risk of non-operation of the GOA circuit caused by the failure of the TFT element can be effectively reduced, and the working reliability of the GOA circuit is effectively improved.

A display panel includes: any one of the afore-described array substrates; a color filter, opposite to the array substrate; and a liquid crystal layer, disposed between the array substrate and the color filter.

Specifically, the color filter is an optical filter reflecting color, which can accurately select light in a certain band range to pass through and reflect light of other bands. The basic structure of the color filter is composed of a glass substrate, a black matrix, a color layer, an over coat, and an ITO conductive film. Liquid crystal refers to that in a molten state or after being dissolved by a solvent, the fluidity of liquid is obtained while the rigidity of a solid matter is lost, and anisotropic ordered arrangement of some of crystal matter molecules is retained, so as to form an intermediate-state matter having certain properties of both crystal and liquid. The liquid crystal layer formed by liquid crystal molecules is disposed between the array substrate and the color filter. In the presence of energization, conduction is achieved, the arrangement is ordered, and it is easy for light to pass. In the absence of energization, the arrangement is disordered, and the light is prevented from passing through.

Referring to FIG. 2, the GOA circuit is in diverse forms. However, the output of the GOA circuit is controlled by the TFT device 211. Therefore, the stable operation of the TFT device 211 is particularly important. In a conventional GOA circuit, since all TFT elements in a conventional TFT device 211 are tightly distributed without having any gap therebetween, the failure of one of the TFT elements will lead to the failure of the entire TFT device 211, and consequently, the entire GOA circuit cannot operate. To reduce the failure possibility of the GOA circuit, the TFT device 211 of the GOA circuit is split into a plurality of TFT units. Referring to FIG. 1, a first-type TFT unit 101, a second-type TFT unit 201, a third-type TFT unit 401, and a fourth-type TFT unit 301 are included. Gates of the TFT units are connected together, sources of the TFT units are connected together, and drains of the TFT units are connected together. The gate of the first-type TFT unit 101 is connected to a control signal output end of the GOA circuit, and is equivalent to a gate of an original TFT device 211. The drain of the second-type TFT unit 201 is connected to a clock signal input end of the GOA circuit, and is equivalent to a drain of the original TFT device 211. The source of the third-type TFT unit 401 is connected to a driven unit, and is equivalent to a source of the original TFT device 211.

It will be appreciated that in an embodiment, referring to FIG. 3, the number of fourth-type TFT units 301 is not unique, where 10 is the first-type TFT unit, 20 is the second-type TFT unit, 40 is the third-type TFT unit, and other TFT units are all the fourth-type TFT units. When any one of the fourth-type TFT units is failed, the failed fourth-type TFT unit can be directly cut off, and it is still possible for the remaining TFT units to output a scanning drive signal to the driven unit. Further, the array substrate also has a display area and a non-display area adjacent to the display area, the GOA circuit is located in the non-display area, the driven unit is a pixel unit arranged in the display area in array arrangement, and each GOA circuit drives a pixel row.

According to the foregoing display panel, a TFT device located at an output end of the GOA circuit includes a plurality of TFT units that are disposed at intervals. Gates of the TFT units are connected, drains of the TFT units are connected, and sources of the TFT units are connected. Cascaded connection to the GOA circuit and the driven unit is implemented through the gate of the first-type TFT unit, the drain of the second-type TFT unit, and the source of the third-type TFT unit, so as to complete corresponding functions of the TFT device. Since the fourth-type TFT unit is only connected to other units of the TFT device, when the fourth-type TFT unit is failed, the failed fourth-type TFT unit can be directly cut off. This does not affect the normal working of the TFT device, and a drive signal can be still normally output. By means of the foregoing display panel, a risk of non-operation of the GOA circuit caused by the failure of the TFT element can be effectively reduced, and the working reliability of the GOA circuit is effectively improved.

A display device includes a backlight module and the foregoing display panel. Specifically, the backlight module supplies sufficient brightness and uniformly-distributed light sources to the display panel, so that an image can be normally displayed. A liquid crystal display is a passive light emitting element, the display panel is not luminous itself, and image or character display of the display panel is a result of modulating light. Referring to FIG. 2, the GOA circuit is in diverse forms. However, the output of the GOA circuit is controlled by the TFT device 211. Therefore, the stable operation of the TFT device 211 is particularly important. In a conventional GOA circuit, since all TFT elements in a conventional TFT device 211 are tightly distributed without having any gap therebetween, the failure of one of the TFT elements will lead to the failure of the entire TFT device 211, and consequently, the entire GOA circuit cannot operate.

To reduce the failure possibility of the GOA circuit, the TFT device 211 of the GOA circuit is split into a plurality of TFT units. Referring to FIG. 1, a first-type TFT unit 101, a second-type TFT unit 201, a third-type TFT unit 401, and a fourth-type TFT unit 301 are included. Gates of the TFT units are connected together, sources of the TFT units are connected together, and drains of the TFT units are connected together. The gate of the first-type TFT unit 101 is connected to a control signal output end of the GOA circuit, and is equivalent to a gate of an original TFT device 211. The drain of the second-type TFT unit 201 is connected to a clock signal input end of the GOA circuit, and is equivalent to a drain of the original TFT device 211. The source of the third-type TFT unit 401 is connected to a driven unit, and is equivalent to a source of the original TFT device 211. It will be appreciated that in an embodiment, referring to FIG. 3, the number of fourth-type TFT units 301 is not unique, where 10 is the first-type TFT unit, 20 is the second-type TFT unit, 40 is the third-type TFT unit, and other TFT units are all the fourth-type TFT units. When any one of the fourth-type TFT units is failed, the failed fourth-type TFT unit can be directly cut off, and it is still possible for the remaining TFT units to output a scanning drive signal to the driven unit.

In an embodiment, the display device further includes a first polarizer, disposed on a side, away from the liquid crystal layer, of the color filter; and a second polarizer, disposed on a side, away from the liquid crystal layer, of the array substrate.

Specifically, a liquid crystal material is placed between two pieces of transparent conductive glass attached to of polarizers with vertical optical axes, liquid crystal molecules are distributed in parallel to the transparent conductive glass when no voltage is exerted, the two pieces of transparent conductive glass are separately provided with an alignment film oriented vertically to each other, and the liquid crystal molecules are rotationally arranged in the direction of a thin groove of the alignment film in sequence. If no electric field is exerted, light is emitted from the second polarizer, a polarization direction of the light rotates for 90 degrees according to the arrangement of the liquid crystal molecules, the light can be emitted out from the first polarizer, and in this case, a bright state is formed. If the two pieces of transparent conductive glass are energized, an electric field will be formed between the two pieces of transparent conductive glass to further affect the arrangement of the liquid crystal molecules therebetween. When the voltage is high enough, the molecules are vertically arranged along the electric field, the polarization direction of light is not changed, the light cannot penetrate, and then a light source is covered, so as to form a dark state in the case of exerting voltage.

In an embodiment, the backlight module is a side-light type backlight module. Specifically, the side-light type backlight module refers to that an edge lighting is disposed on a side surface of a light guide plate and the light guide plate makes light uniformly emitted behind a liquid crystal panel. The design of the side-light type backlight module endows the display device with the advantages of a light weight, thinness, a narrow bezel, and low power consumption. It will be appreciated that in other embodiments, the backlight module can also be a direct-light type backlight module or a hollow type backlight module, provided that a corresponding light source is provided to the display device.

According to the foregoing display device, a TFT device located at an output end of the GOA circuit includes a plurality of TFT units that are disposed at intervals. Gates of the TFT units are connected, drains of the TFT units are connected, and sources of the TFT units are connected. Cascaded connection to the GOA circuit and the driven unit is implemented through the gate of the first-type TFT unit, the drain of the second-type TFT unit, and the source of the third-type TFT unit, so as to complete the corresponding functions of the TFT device. Since the fourth-type TFT unit is only connected to other units of the TFT device, when the fourth-type TFT unit is failed, the failed fourth-type TFT unit can be directly cut off. This does not affect the normal working of the TFT device, and a drive signal can be still normally output. By means of the foregoing display device, a risk of non-operation of the GOA circuit caused by the failure of the TFT element can be effectively reduced, and the working reliability of the GOA circuit is effectively improved.

Various technical features in the foregoing embodiments can be combined randomly. For ease of description, possible combinations of various technical features in the foregoing embodiments are not all described. However, the combinations of the technical features should be considered as falling within the scope recorded in this specification as long as they have no collision with each other.

The foregoing embodiments only describe several implementations of this application, which are described specifically and in detail, however, it should not be construed as a limitation to the patent scope of the present disclosure. It should be noted that, a person of ordinary skill in the art can make various changes and improvements without departing from the ideas of this application, which shall all fall within the protection scope of this application. Therefore, the protection scope of the patent of this application shall be subject to the appended claims.

The invention claimed is:

1. An array substrate, comprising:
a Gate Driver on Array (GOA) circuit, an output end of the GOA circuit being provided with a Thin Film Transistor (TFT) device, the TFT device comprising a plurality of TFT units that are disposed at intervals and comprise a first-type TFT unit, a second-type TFT unit, a third-type TFT unit and a fourth-type TFT unit,
a source of the first-type TFT unit, a source of the second-type TFT unit, a source of the third-type TFT unit, and a source of the fourth-type TFT unit being connected, a drain of the first-type TFT unit, a drain of the second-type TFT unit, a drain of the third-type TFT unit, and a drain of the fourth-type TFT unit being connected, and a gate of the first-type TFT unit, a gate of the second-type TFT unit, a gate of the third-type TFT unit, and a gate of the fourth-type TFT unit being connected, wherein the gate of the first-type TFT unit is further configured to connect to a control signal output end of the GOA circuit, the drain of the second-type TFT unit is further configured to connect to a clock signal input end of the GOA circuit, and the source of the third-type TFT unit is further configured to connect to a driven unit.

2. The array substrate according to claim 1, wherein each TFT unit comprises a plurality of TFT elements, and a number of TFT elements of each TFT unit is the same.

3. The array substrate according to claim 2, wherein each TFT unit comprises six TFT elements.

4. The array substrate according to claim 2, wherein each TFT unit comprises three TFT elements.

5. The array substrate according to claim 4, wherein each TFT unit comprises a first TFT element, a second TFT element, and a third TFT element;
a source of the first TFT element is connected to a source of the second TFT element, and the sources thereof are both connected to a source of the third TFT element; a drain of the second TFT element is connected to a drain of the third TFT element, and the drains thereof are both connected to a drain of the first TFT element; the source of the third TFT element is connected to an adjacent TFT unit, and the drain of the first TFT element is connected to an adjacent TFT unit; and a gate of the first TFT element is connected to a gate of the second TFT element, and the gates thereof are both connected to a gate of the third TFT element.

6. The array substrate according to claim 1, wherein the driven unit is a pixel unit.

7. The array substrate according to claim 6, wherein the array substrate has a non-display area and a display area adjacent to the non-display area, the pixel unit is disposed in the display area in array distribution, the GOA circuit is disposed in the non-display area, and each GOA circuit provides a drive signal for each pixel row.

8. The array substrate according to claim 7, wherein the pixel unit comprises a red pixel unit, a green pixel unit, a blue pixel unit, and a white pixel unit.

9. The array substrate according to claim 7, wherein the pixel unit comprises a red pixel unit, a green pixel unit, and a blue pixel unit.

10. The array substrate according to claim 1, wherein the number of the fourth-type TFT units is 23.

11. A display panel, comprising:
an array substrate, comprising:
a Gate Driver on Array (GOA) circuit, an output end of the GOA circuit being provided with a Thin Film Transistor (TFT) device, the TFT device comprising a plurality of TFT units that are disposed at intervals and comprise a first-type TFT unit, a second-type TFT unit, a third-type TFT unit and a fourth-type TFT unit,
a source of the first-type TFT unit, a source of the second-type TFT unit, a source of the third-type TFT unit, and a source of the fourth-type TFT unit being connected, a drain of the first-type TFT unit, a drain of the second-type TFT unit, a drain of the third-type TFT unit, and a drain of the fourth-type TFT unit being connected, and a gate of the first-type TFT unit, a gate of the second-type TFT unit, a gate of the third-type TFT unit, and a gate of the fourth-type TFT unit being connected, wherein the gate of the first-type TFT unit is further configured to connect to a control signal output end of the GOA circuit, the drain of the second-type TFT unit is further configured to connect to a clock signal input end of the GOA circuit, and the source of the third-type TFT unit is further configured to connect to a driven unit;
a color filter, the color filter being opposite to the array substrate; and
a liquid crystal layer, the liquid crystal layer being disposed between the array substrate and the color filter.

12. A display device, comprising:
a backlight module; and
a display panel, comprising:
an array substrate, comprising:
a Gate Driver on Array (GOA) circuit, an output end of the GOA circuit being provided with a Thin Film Transistor (TFT) device, the TFT device comprising a plurality of TFT units that are disposed at intervals and comprise a first-type TFT unit, a second-type TFT unit, a third-type TFT unit and a fourth-type TFT unit,
a source of the first-type TFT unit, a source of the second-type TFT unit, a source of the third-type TFT unit, and a source of the fourth-type TFT unit being connected, a drain of the first-type TFT unit, a drain of the second-type TFT unit, a drain of the third-type TFT unit, and a drain of the fourth-type TFT unit being connected, and a gate of the first-type TFT unit, a gate of the second-type TFT unit, a gate of the third-type TFT unit, and a gate of the fourth-type TFT unit being connected, wherein the gate of the first-type TFT unit is further configured to connect to a control signal output end of the GOA circuit, the drain of the second-type TFT unit is further configured to connect to a clock signal input end of the GOA circuit, and the source of the third-type TFT unit is further configured to connect to a driven unit;
a color filter, the color filter being opposite to the array substrate; and
a liquid crystal layer, the liquid crystal layer being disposed between the array substrate and the color filter.

13. The display device according to claim 12, further comprising:
a first polarizer, disposed on a side, away from the liquid crystal layer, of the color filter; and
a second polarizer, disposed on a side, away from the liquid crystal layer, of the array substrate.

14. The display device according to claim 12, wherein the backlight module is a side-light type backlight module.

* * * * *